P. F. WILLIAMS.
POTHEAD CUT-OUT.
APPLICATION FILED FEB. 23, 1909.

1,175,103.

Patented Mar. 14, 1916.
3 SHEETS—SHEET 1.

Witnesses

Inventor
Paul F. Williams
by A. Miller Belfield
Atty

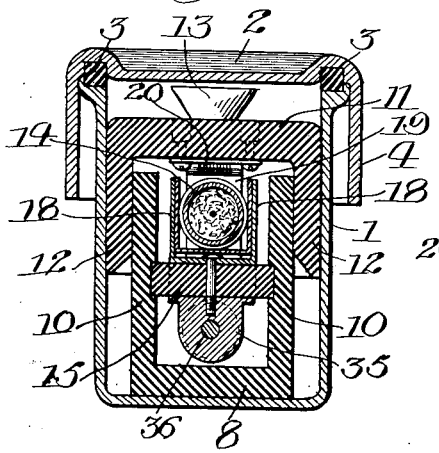
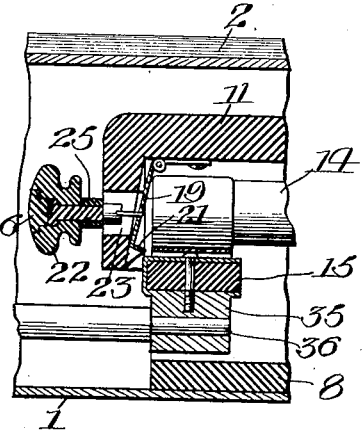
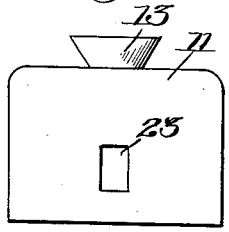
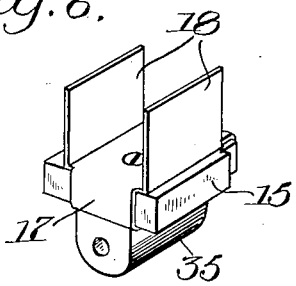
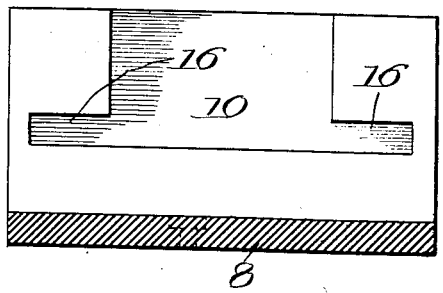

P. F. WILLIAMS.
POTHEAD CUT-OUT.
APPLICATION FILED FEB. 23, 1909.
1,175,103.
Patented Mar. 14, 1916.
3 SHEETS—SHEET 3.
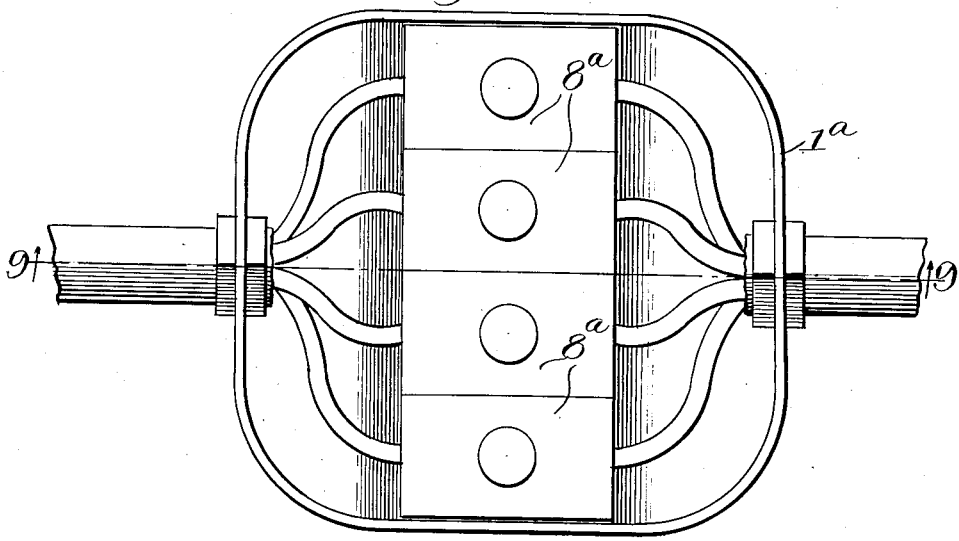
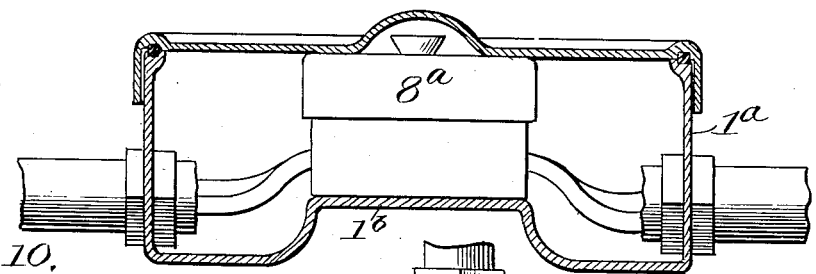
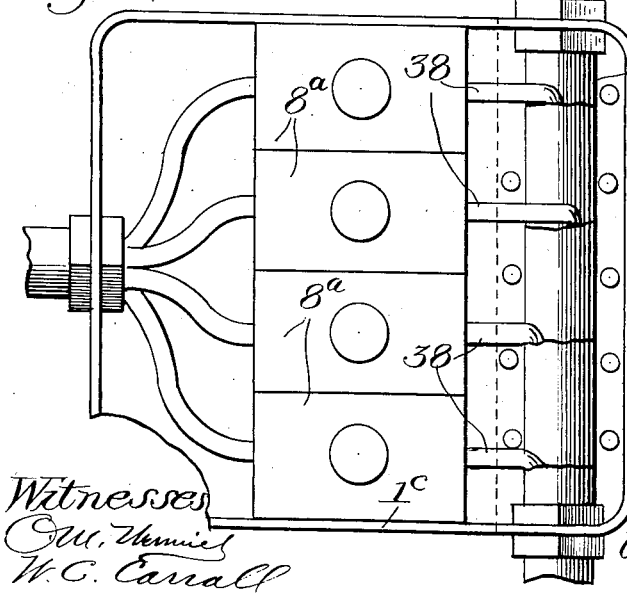
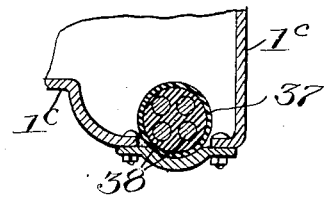
Witnesses
Inventor
Paul F. Williams

UNITED STATES PATENT OFFICE.

PAUL F. WILLIAMS, OF CHICAGO, ILLINOIS, ASSIGNOR TO G. & W. ELECTRIC SPECIALTY CO., OF CHICAGO, ILLINOIS, A CORPORATION OF ILLINOIS.

POTHEAD CUT-OUT.

1,175,103.   Specification of Letters Patent.   Patented Mar. 14, 1916.

Application filed February 23, 1909. Serial No. 479,419.

*To all whom it may concern:*

Be it known that I, PAUL F. WILLIAMS, citizen of the United States, residing at Chicago, in the county of Cook and State of Illinois, have invented a certain new and useful Improvement in Pothead Cut-Outs, of which the following is a full, clear, concise, and exact description, reference being had to the accompanying drawings, forming a part of this specification.

This invention relates to a type of device developed by me, and called "pot-head." Such devices form terminals for the ends of the cables, permitting the cable conductors to be led out of the cable for proper connection and hermetically sealed so as to protect them absolutely from water and moisture and any other possible danger.

My present invention contemplates the arrangement of a cut-out or circuit-protecting device in connection with such a pot-head device. Accordingly, I provide, as a convenient arrangement, an exterior casing or shell, into which the ends of the cable are led, terminated and sealed in pot-head fashion, and I also provide an inner cut-out arrangement which is connected properly with the sealed cables. This cut-out device is preferably so arranged that it can be manipulated to withdraw it from the circuit, or replaced in the usual way after operation. I also provide an arrangement for terminating a plurality of cables in a single pot-head structure. In fact, I show two different forms of such arrangement.

Figure 1:
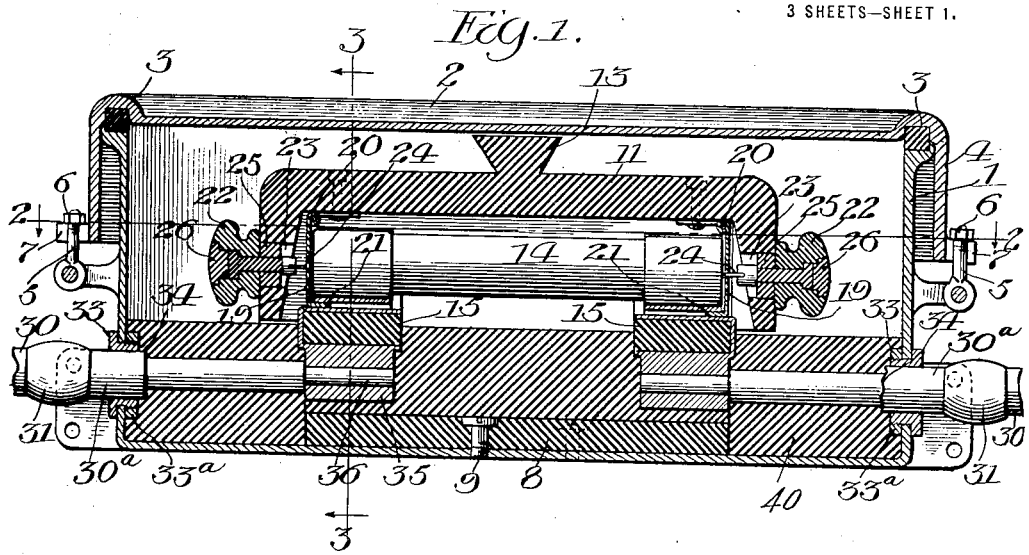
Figure 2:
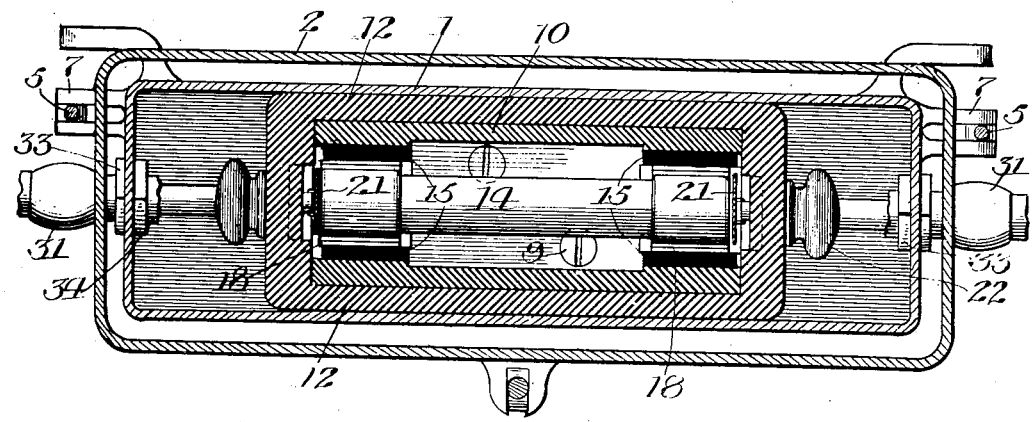

In the accompanying drawings—Figure 1 is a vertical section of a pot-head device embodying my present invention; Fig. 2 is a longitudinal section taken on the line 2—2 in Fig. 1; Fig. 3 is a cross-section taken on the line 3—3, Fig. 1; Fig. 4 is a detail of construction showing the operation of the cut-out device and associated mechanism; Fig. 5 is an end view of the cover of the cut-out device box; Fig. 6 is a perspective view of the structure for holding the cut-out device; Fig. 7 is a longitudinal section of the lower porcelain member of the cut-out box with its mechanism removed; Fig. 8 is a plan of the pot-head device for a plurality of cables embodying my present invention; Fig. 9 is a section taken on the line 9—9 in Fig. 8; Fig. 10 is a plan view of another construction of pot-head for a plurality of conductors; and Fig. 11 is a view of one side of the bottom portion of the device shown in Fig. 10, such Fig. 11 showing the portion of the outer casing in section, and also showing the cable in end elevation.

Referring first to the device shown in Figs. 1 to 7, inclusive, this device comprises a casing 1, which can be of any suitable material, but is preferably made of iron. This casing is conveniently made of substantially rectangular form and is open at the top, and provided with a removable cover 2. This cover is provided with a gasket 3, of rubber or some other suitable material, which coöperates with the top edge of the casing 1, so as to form a tight joint or connection. The cover 2 is also provided with an over-hang 4, extending well down the sides of the casing 1, and affording additional protection against the entry of water and moisture. The cover 2 is held in place by lock-bolts 5, 5, located at opposite ends and at the center of the front of the box, and provided with nuts 6, 6, which engage lugs 7, 7, on the cover.

Within the box 1 is a cut-out or a circuit protective device, which is to be included in the circuit of the cable terminating at the box. While, in accordance with my invention, this cut-out device could be of any suitable construction, that herein shown is a particularly advantageous one, and forms, I consider, a matter of further and specific improvement. The cut-out shown comprises a box 8, desirably made of insulating material, and located in the interior of the casing 1, the floor of the box 8 resting upon the bottom of the casing 1, and being desirably secured thereto as by a screw 9. The box 8 has side walls 10, 10, but no end walls, the ends being open. The box has a cover 11, whose sides 12, 12, fit closely over the side walls 10, 10, and inside of the casing 1. This cover 11 has a knob 13, by which it can be lifted. The box 8 and cover 11 are desirably made of insulating material, preferably porcelain or some similar material.

Within the box is a fuse device, or other circuit-protecting instrumentality, by which the circuit can be controlled as desired. This is preferably so arranged that it can be withdrawn from the circuit at will, whether operated or not, and also permitting repair or replacement after operation. While various arrangements could be used, the one shown herein I find advantageous and possessing desirable features. It comprises a fuse 14, mounted upon cross-pieces or shelves, 15, 15, which are in turn supported by the side-walls 10 of the fuse box, such walls being conveniently provided with recesses 16, 16, for that purpose. These shelves 15, 15, carry metal clips 17, 17, having upright lugs or ears 18, 18, into which the fuse 14 is removably fitted, the latter being any suitable well-known or commercial type of fuse. As an arrangement for bodily removing this fuse 14, when desired, the cover 11 of the fuse box is provided with hooks 19, 19, pivoted to the box cover 11 at 20, 20, and having lower ends or hook portions 21, 21, which extend down below the ends of the fuse 14 and engage the same. The cover 11 is also provided with plugs 22, 22, at its ends, which plugs are fitted into holes 23, 23, in the ends of the cover 11, so that they can be pulled out of and inserted into said holes, and these plugs 22 carry connections 24, 24, which engage the hooks 19, 19, so that by pulling the plugs 22 outwardly, the hooks 19, 19 are swung outwardly, and their lower ends disengaged from the fuse 14. The apertures 23 are higher than they are wide, and the hub portions 25 of the plugs 22 are of corresponding size and shape, so that when the plugs are in their inner position, as shown in Fig. 1, they fit snugly in the ends of the fuse box cover, but when they are withdrawn to disengage the cover hooks 19 from the fuse, the plugs 22 can be turned a quarter turn to one side, which will bring the hub portions 25 out of correspondence or register with the apertures 23, so that the plugs will be held in their outer or withdrawn positions. Normally, the fuse 14 is engaged by the cover 11, so that when the cover is lifted, the fuse will also be lifted, and thereby, automatically as it were, withdrawn from its circuit connections; but when the plugs 22 are withdrawn, the cover 11 is disconnected from the fuse, so that if the cover is removed, the fuse is not disturbed, but is left in its proper and normal position. The plugs 22 have hermetically sealed ends 26, insuring absolute insulation from the fuse and circuit connections, and thereby protecting the latter against moisture and trouble, and also protecting any one operating the device from danger. The inner faces of the cover ends are inclined, as shown in Figs. 1 and 4, to allow the withdrawal operation and proper movement of the hook devices, 19, 19, as shown in Fig. 4.

Cable ends 30, 30 are shown led to the device and extended into same. Metal sleeves, 30$^a$, preferably copper, are outside of the cables where same enter casing. Wipe joints 31, 31, are outside of the casing at the outer ends of the metal sleeves 30$^a$, 30$^a$, for hermetically sealing ends of same, and therefore of cable. These sleeves 30$^a$, 30$^a$ fit in collars 33, fitted into apertures in the casing 1. Inside of the casing 1 are nuts 33$^a$, screwed onto said collar and holding same firmly in place. The cable ends extend to terminal members 35, 35, conveniently formed below and as a part of clips 17, 17. The cable conductors 36, 36, are formed or secured in these terminals, as by sweating or otherwise. Thus, the device is arranged with the cable end led into the interior of the casing or pot-head, and connected in circuit with a fuse removable and replaceable at will. This is not the final condition of the apparatus, however, for the lower portion of the casing 1 is filled with compound 40, so as to hermetically seal the various parts and connections therein. Thus, I provide a device for the advantages and facilities mentioned, and one in which the cable is hermetically sealed so as to prevent effectually any injurious effects from moisture and water and other causes.

In Figs. 8 and 9, I show an arrangement for a plurality of cables. This arrangement comprises a metal casing 1$^a$, containing a plurality (as, for example, four) fuse boxes 8$^a$, 8$^a$, 8$^a$, 8$^a$. The general arrangement of the fuse boxes and cable terminals is similar to that shown and described for a single cable, this arrangement being shown to illustrate the manner in which the invention can be utilized for a plurality of cables, or for a plural strand cable. Upon reference to Fig. 9, it will be noticed that the bottom of the casing 1$^a$ is made with a central elevation 1$^b$, on which the fuse boxes 8$^a$ are set. This affords a deep space at the ends of the fuse boxes, capable of receiving and containing the enlarged cable and the several strands or parts thereof, and permits the insulating compound to be filled into the casing so as to cover the cable ends without covering or interfering with the fuses. The arrangement in Figs. 10 and 11 is also for a plural strand or part cable, or for a plurality of cables, and it likewise embraces a large casing 1$^c$, and a plurality of fuse boxes 8$^b$, 8$^b$ (as, for example, four), as shown. The general arrangement of these cables is also, as before described in connection with the device of Figs. 1 to 7. The peculiarity of this arrangement, of Figs. 10 and 11, is that one cable, 37, runs crosswise of the length of the fuse boxes, and is tapped at different points in its length by sections or parts 38, 38, running to the several fuse boxes. The opposite sides of the bottom of the casing 1$^c$ are depressed, as shown in Fig. 11, so as to accommodate the enlarged cables, and the insulating compound. Detachable plates are provided so that the box can be laid on the cable, and then the detachable plate put in place. This makes it unnecessary to cut the cable to get it inside of the box.

It will be understood that changes and modifications can be made without departing from the spirit of the invention.

What I claim is:

1. The combination of a casing, a fuse box therein, a fuse in said box, said fuse box having a removable cover, and means operable between the casing and the fuse box whereby said fuse may be engaged or disengaged to permit it to be removed from or left within the fuse box when the cover thereof is lifted, said means being movable longitudinally of the fuse box.

2. In a cable terminal in combination, an insulating member having a channel provided with open ends, terminals mounted in the open ends of said channel, and a cover for said member having flanges extended down to cover the open ends of said channels.

3. In a cable terminal in combination, an interior box, a cover for said box, contacts carried within said box, a fuse carried on said cover, and grasping means carried by said cover and inclosing the ends of said fuse.

4. In a cable terminal in combination, an interior box, a cover for said box, a fuse carried by said cover, and grasping devices for attaching said fuse to said cover, said devices having a movement longitudinally of said fuse.

5. In a cable terminal in combination, an interior box having terminals therein, a cover for said box, a fuse connecting said terminals, hinged means carried by said cover for attaching said fuse to said cover, and means for controlling said hinged means operable from without the box and moving longitudinally of said fuse.

6. In a cable terminal in combination, an interior box having terminals therein, a fuse connecting said terminals, a cover for said box, a pair of plates rigidly attached to said cover, and plates hinged to said first named plates for attaching said fuse to said cover.

7. In a cable terminal in combination, a box having terminals therein, a fuse connecting said terminals, a cover for said box and means hinged directly to said cover for supporting said fuse from said cover.

8. In a cable terminal in combination, an insulating base member having grooves in the side walls thereof, shelves having their ends supported in said grooves, and terminal pieces carried by said shelves.

9. In a cable terminal in combination, a base block provided with sets of grooves at right angles to each other in the side walls thereof, shelves carried in one of said grooves, terminals carried on said shelves, the other of said grooves permitting the introduction of said shelf in said first mentioned groove.

10. In a cable terminal in combination, an insulating member having a channel provided with open ends, terminals mounted in the open ends of said channel, a cover for said member having flanges extended down to cover the open ends of said channels, and means for engaging a cut-out device located in said channel, said means passing through said flanges and into the open ends of said channel to engage said cut-out device.

11. In a cable terminal in combination, a base block carrying fuse terminals, a cover for said block provided with fuse supporting means, and non-rotative means for operating said supporting means.

12. The combination of a casing, provided with a removable cover, conductors entering said casing at the sides, a fuse box resting on the floor of said casing, and also provided with a removable cover, a fuse in said fuse box in alinement with said conductors and means on the fuse box cover for engaging said fuse to permit the removal of the fuse with the fuse box cover.

13. A cable terminal comprising in combination, an outer casing, an interior box of insulating material attached to said casing on one side but spaced therefrom on the remaining sides, said interior box being open at its ends and having terminals therein in its lower portion, conductors entering said casing and attached to said terminals, a fuse in electrical connection with said terminals but held by said box above the level of the terminals, and a continuous body of compound filling the interior of said case and box above the level of said terminals, said compound serving to seal said conductors in place and to insulate said terminals from each other.

14. The combination of a casing, a fuse box having a removable cover within said casing, a fuse within said fuse box, and means secured to the cover of said fuse box and operable between the casing and the fuse box whereby said fuse may be removed from said fuse box when said box is opened.

15. In a cable terminal in combination, an insulating member having a channel provided with open ends, terminals mounted in the open ends of said channel, a cover for said member having flanges extended down to cover the open ends of said channel, and means for engaging a cut-out device located in said channel, said terminals having contact surfaces at the sides of said channel and said engaging means being carried by said flanges and being arranged to engage said cut-out device between the side contact surfaces of said terminals.

16. The combination of a casing, a fuse box therein, a fuse in said fuse box, said fuse box having a removable cover, and means carried by the cover and operable between the casing and the fuse box whereby said fuse may be engaged or disengaged to permit it to be removed from or left within the fuse box when the cover thereof is lifted.

17. The combination of a casing, a fuse box therein, a fuse in said fuse box having a removable cover, and means operable from the outside of the fuse box whereby said fuse may be engaged or disengaged to permit it to be removed from or left within the fuse box when the cover thereof is lifted, said casing being provided with a removable cover arranged above the cover of said fuse box.

18. In a cable terminal in combination, an insulating member having a channel provided with open ends, terminals mounted in the open ends of said channel, a cover for said member having flanges extended down to cover the open ends of said channel, and means for engaging a cut-out device located in said channel, said terminals having contact surfaces at the sides of said channel and said engaging means being carried by said flanges and being arranged to engage said cut-out device between the side contact surfaces of said terminals, said engaging means comprising plugs 22 movable in apertures in the end flanges of said cover and hook members 19 pivoted to the interior of the cover and extended across the end of the cut-out device and adapted to engage the same, said hook members 19 being connected with the plugs 22 so that the movement of the latter will cause a movement of said hook members 19 so as to engage and disengage the ends of the cut-out device.

19. In a cable terminal in combination, an insulating member having a channel provided with open ends, terminals mounted in the open ends of said channel, a cover for said member having flanges extended down to cover the open ends of said channel, and means for engaging a cut-out device located in said channel, said terminals having contact surfaces at the sides of said channel and said engaging means being carried by said flanges and being arranged to engage said cut-out device between the side contact surfaces of said terminals, said engaging means comprising plugs 22 movable in apertures in the end flanges of said cover and hook members 19 pivoted to the interior of the cover and extended across the ends of the cut-out device and adapted to engage the same, said hook members 19 being connected with the plugs 22 so that the movement of the latter will cause a movement of said hook members 19 so as to engage and disengage the ends of the cut-out device, said plugs 22 and the apertures therefor being of greater length than width whereby when the plugs are withdrawn from the apertures said plugs may be turned so as to hold them in a withdrawn condition.

20. The combination of a metallic casing, of elongated rectangular form, a fuse box made of insulating material and mounted upon the floor of said casing, said fuse box being also of elongated rectangular form, of slightly less width and materially less length than said casing, forming narrow side spaces and substantial end spaces between said fuse box and said casing, a removable cover for said fuse box, a fuse within said fuse box, and operable means carried by said cover and located at the ends thereof for engaging said fuse to engage or release said fuse, said means extending through said cover so that the inner portions thereof engage the ends of said fuse and the outer portions thereof are located outside of said cover and in the space at the ends of the fuse box.

21. The combination of a metallic casing, of elongated rectangular form, a fuse box made of insulating material and mounted upon the floor of said casing, said fuse box being also of elongated rectangular form, of slightly less width and materially less length than said casing, forming narrow side spaces and substantial end spaces between said fuse box and said casing, a removable cover for said fuse box, a fuse releasably mounted within said fuse box, and means carried by said cover and located at the ends thereof for engaging said fuse and releasing the same, said means extending through said cover so that the inner portions thereof engage the ends of said fuse and the outer portions thereof are located outside of said cover and in the space at the ends of the fuse box, said fuse box having its ends provided with terminals and said casing having its ends provided with cable openings to permit cable conductors to extend through said casing walls and to the terminals of said fuse box.

In witness whereof I hereunto subscribe my name this 20th day of February, A. D. 1909.

PAUL F. WILLIAMS.

Witnesses:
MAX W. ZABEL,
A. M. BELFIELD.